INVENTORS
WILLIAM G. ECKERT
ARMANDO ARAUJO
FRANK D. JONAS

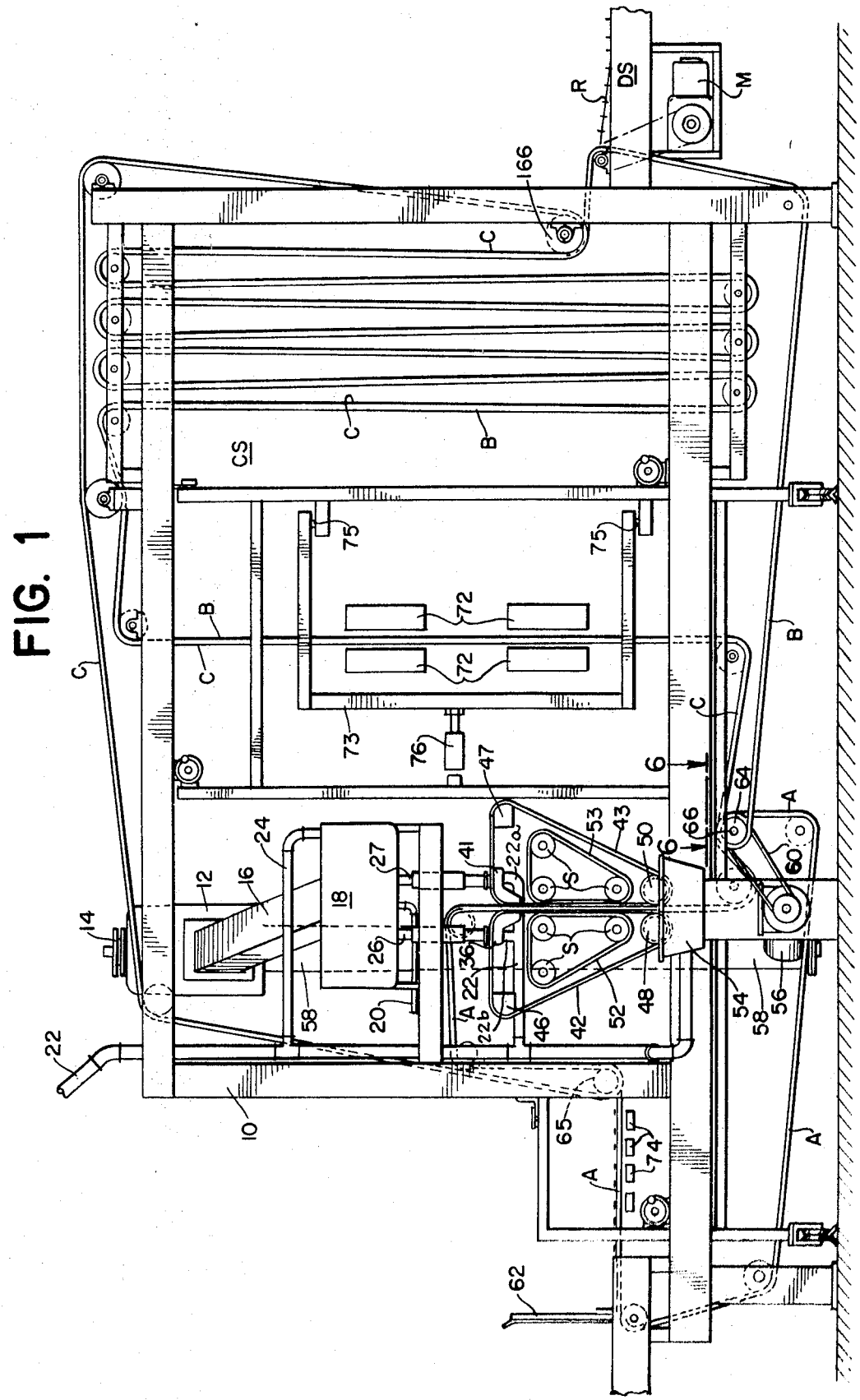

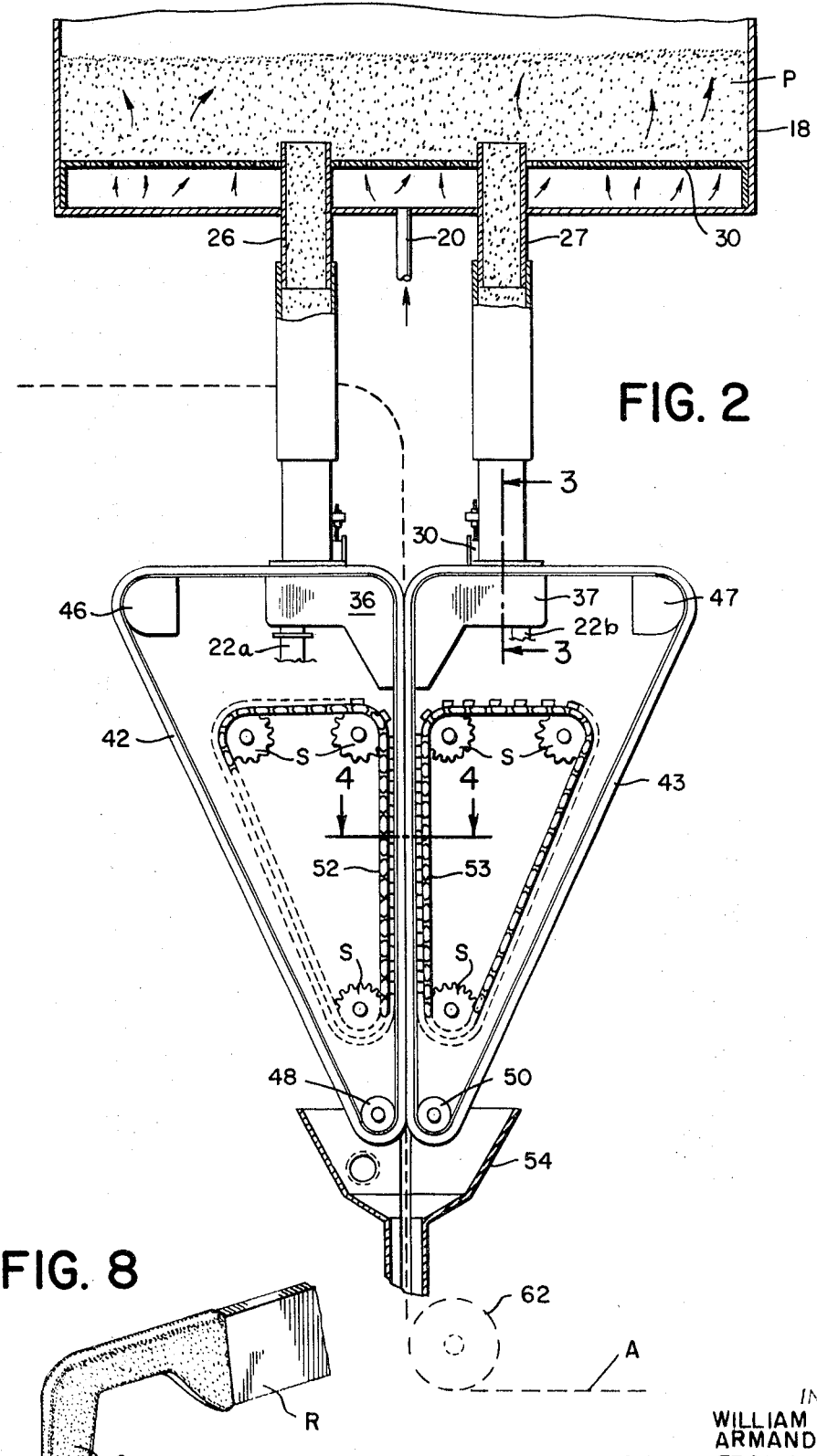

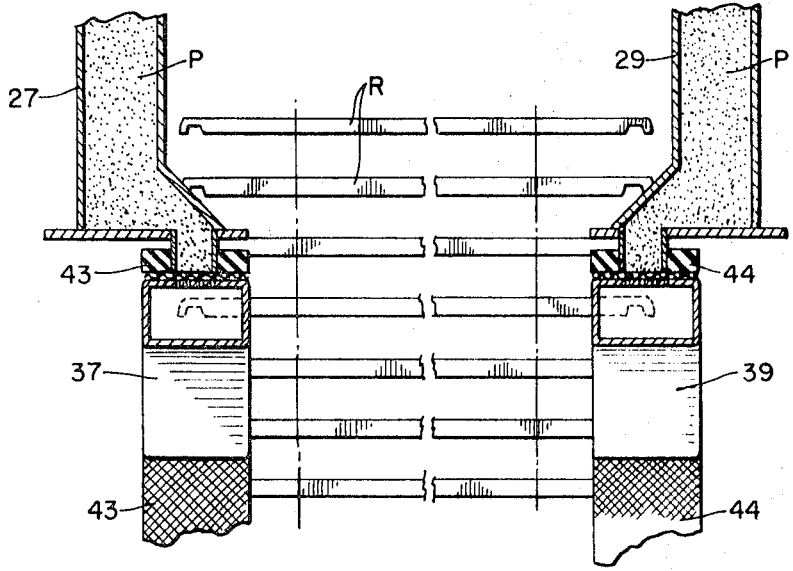
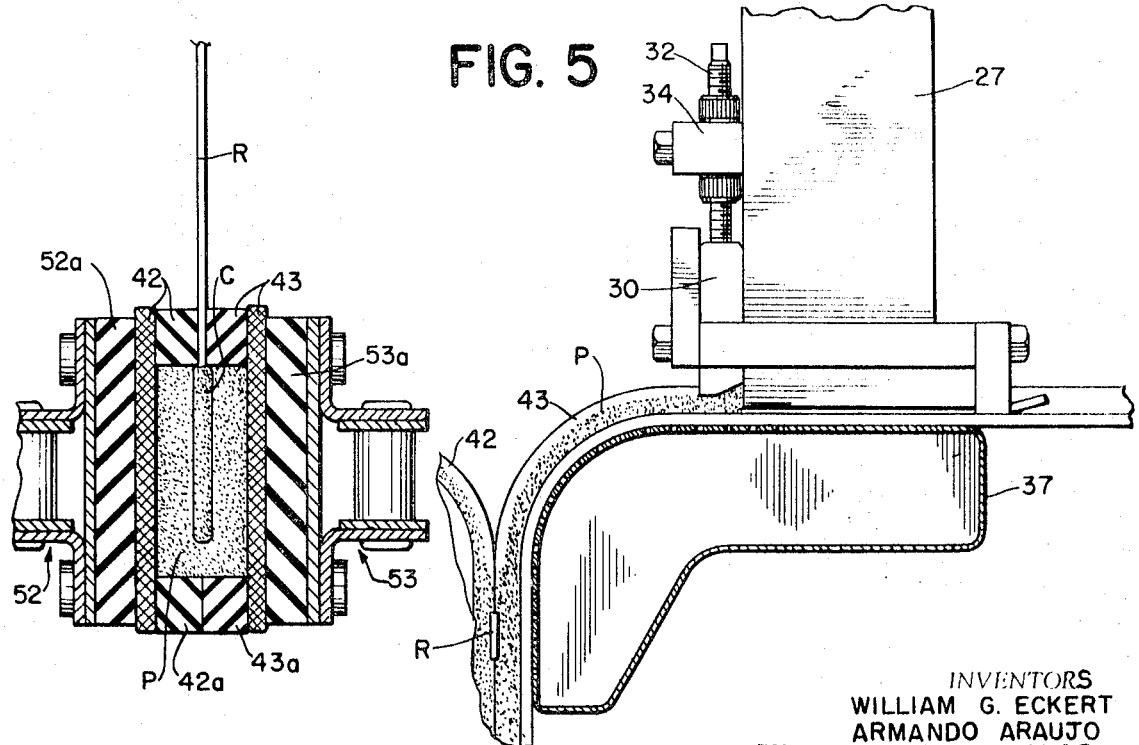

ATTORNEYS

United States Patent Office 3,589,926
Patented June 29, 1971

3,589,926
METHOD OF COATING THE ENDS OF ELONGATED BODIES AND THE APPARATUS THEREFOR
William G. Eckert, Massapequa Park, Armando Araujo, Freeport, and Frank D. Jonas, Upper Brookville, N.Y., assignors to Oxford Filing Supply Co., Inc., Garden City, N.Y.
Continuation of application Ser. No. 432,251, Feb. 12, 1965. This application Feb. 18, 1969, Ser. No. 817,214
Int. Cl. B44d 1/094
U.S. Cl. 117—21                                             10 Claims

ABSTRACT OF THE DISCLOSURE

A method and apparatus for coating the ends of elongated members, particularly file folder hanger rods, with plastic material which is firmly bonded thereto to provide for easy sliding action on the cooperating suspension rods. The hanger rods are advanced along a path extending transverse to their axes and after being conditioned as by heating to cause powdered plastic material to adhere thereto, the ends of the rods are caused to enter between pairs of porous belts having compressible edges, which belts carry powder which is thus pressed against the rod ends and adheres thereto. The powder is taken from fluidized beds and flows as a liquid onto the porous belts, being retained thereon by suction which also serves to remove air and compact the powder material.

---

This application is a continuation of application Ser. No. 432,251, filed Feb. 12, 1965 and now abandoned.

This invention is concerned with a continuous process and apparatus for practicing the same by means of which elongated bodies can be coated, particularly at the ends thereof.

The embodiment of the invention selected for disclosure herein will be related to the application of plastic coatings to the ends of discontinuous members such as suspension filing folder hanger rods.

The method and apparatus are particularly applicable to the use of various suitable forms of plastic materials which are applied to the areas to be coated from a powder bed of the material. Adhesion of the coating is preferably effected by heating the article to be coated so that upon immersion in a powder bed of the coating material a sufficient amount of the particles will adhere to the heated surface, so that upon withdrawal from the bed the particles will coalesce until a substantially continuous coating is formed. The coalescence or fusion of the particles into a continuous coating can be speeded up and in some cases improved by the subsequent application of heat after the application of the powder.

In a broader aspect the method and apparatus can also be used to apply suitable coating materials to the articles by adhesion, using a suitable adhesive as an undercoating.

There are many commercially available thermoplastic materials which can be prepared in powder form and are suitable for application in accordance with this invention, depending upon the desired final characteristics of the finished product.

By way of example, some of the material which may be applied in accordance with the method and apparatus of this invention include thermoplastic particles or powder such as powders of polyethylene, polypropylene, nylon, acetal, a vinyl or cellulosic material. It is also possible to use powders of thermosetting materials, such as the powders of epoxy resins, polyesters, phenolics and the like. In the broader sense, where adhesives are used it is also possible to employ metal and glass powders, including, of course, various mixtures of all the above recited materials.

The various and more detailed objects of the invention will become apparent from the following detailed description of the embodiment of the invention selected for illustration in the accompanying drawings.

In those drawings:

FIG. 1 is a side elevational view, with some parts diagrammatically illustrated, of a machine in accordance with this invention, by means of which the process of the invention may be practiced;

FIG. 2 is an enlarged side elevational view of a portion of the mechanism, by means of which the powdered bed is formed, including some parts in cross section;

FIG. 3 is a detailed cross sectional view taken on the line 3—3 of FIG. 2;

FIG. 4 is a detailed cross sectional view taken on the line 4—4 of FIG. 2;

FIG. 5 is an enlarged detailed view, partly in elevation and partly in cross section, showing the mechanism for controlling the feed of the powder material from a source thereover;

FIG. 8 is a perspective view of an end of an elongated body, such as a suspension filing folder hanger rod having a hooked end to which a coating has been applied in accordance with this invention.

Figure 6:
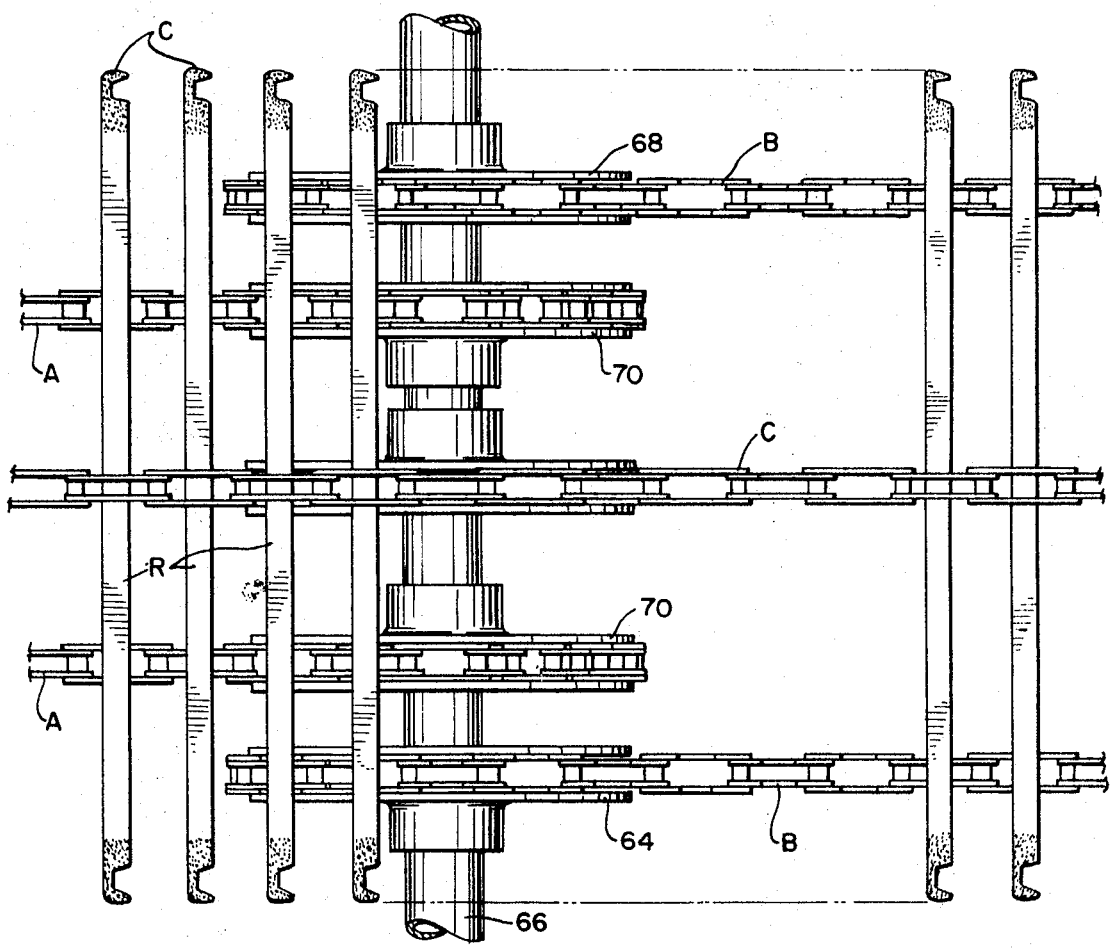
FIG. 6 is a plan view from the plane 6—6 of FIG. 1 of a detail of the general driving mechanism.
Figure 7:
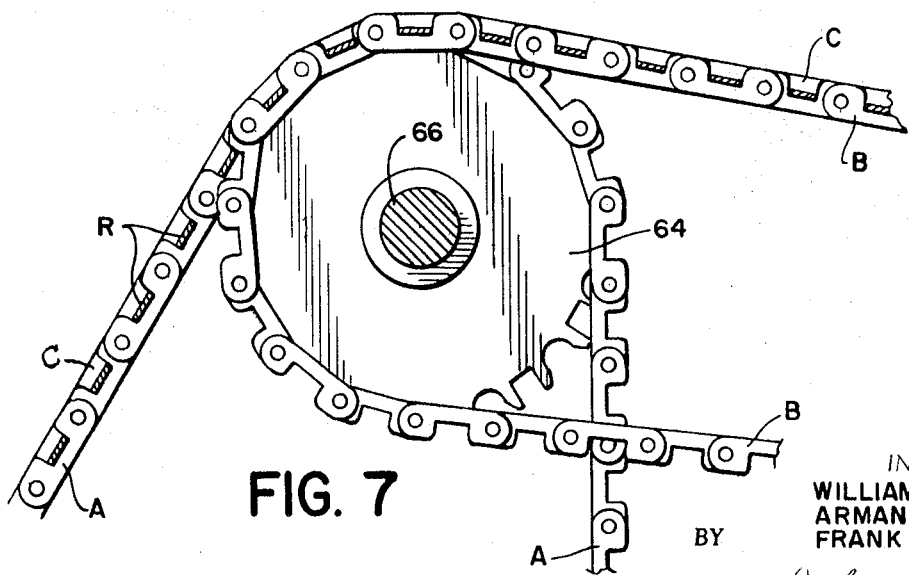
FIG. 7 is an end elevational view of the mechanism illustrated in FIG. 6.

Referring to FIG. 1, any suitable form of frame assembly 10 may be used, on which the various elements comprising the combinations of this invention are mounted for operating coaction. Mounted on the top of the framework is a powder supply container 12, provided with a cover 14 to permit replenishment of the powder as used. The powder is transferred from the container 12 by gravity through a duct 16 into a sealed chamber 18. As shown in FIG. 2, the chamber 18 is provided with a gas pervious diaphragm 30 supported above its bottom to provide a chamber into which a compressed gas, such as air, for example, can be discharged from any suitable source through the supply conduit 20. The bed of powdered coating material P is supported on the gas pervious partition 30, so that when air under pressure is supplied through the pipe 20 it will flow upwardly through the bed and fluidize that bed sufficiently so that it will act somewhat like a liquid. If desired, and as shown, the gas passing through the bed can be withdrawn from the container 18 through the vacuum line 24 connected to a main vacuum line 22, which, if desired, can terminate at a filter cloth bag type of separator to recover any powder carried along by the air.

The powder is conducted from the container 18 by flowing through the discharge pipes 26 and 27 onto the porous belts 42 and 43 which pass over the suction boxes 36 and 37. These boxes are connected by branches 22a and 22b to the suction line 22, see FIGS. 1 and 2. The pipe connections 26 and 27 are sectionalized and have slip joint connections so that they can be adjusted to the desired length as conditions require.

At this point some reference to one form of article suitable for coating should be described, in order to understand the structure of the portion of the machine illustrated in FIGS. 2 and 3. The hanger rod R previously referred to consists usually, but not necessarily, of a thin rectangular metal bar cut away at its ends to form a hook, as clearly shown in FIG. 8, to the surface of which hook it is desired, in accordance with the specific object of this invention, to provide a plastic coating C. Since both ends of such a rod are to be coated it is here noted that in back of the connection 27 is a similar connection 19, and in back of the connection 26 is a connection corresponding to the connection 29. Likewise, in back of the suction box 37, see FIG. 3, is a similar suction box 39, and in back of the suction box 36 is another suction box similar to the box 39 but likewise not shown in any figure. In other words, the powder feeding mechanism shown in FIG. 2 for the processing of one end of the hanger rod R is duplicated for the processing of the opposite end of the rod, as illustrated in FIG. 3. All of the suction boxes are, of course, connected to the vacuum line 22. Passing around the suction boxes 36 and 37 are a pair of flexible belts 42 and 43, which consist of fabric bands having compressible rubber strips 42a and 43a secured along the edges of the bands to form channels, see FIG. 4. When the bands come together in the relationship illustrated in FIG. 4 there results a rectangular channel into which the powder has been fed through each of the pipes 26 and 27 for one side of the machine. At this point it is noted that in back of the endless belt 43 is an endless belt 44 for the other end of the rods and a cooperating belt corresponding to the belt 42, which does not appear in the drawings.

The endless belts 42 and 43 are supported, as previously mentioned, for sliding movement along and around the suction boxes 36 and 37. In the same plane and displaced from the suction boxes are a pair of stationary curved supports 46 and 47, around which these belts also pass. At 48 and 50 are a pair of idler rollers, around which the belts pass and by which they are supported at their lower ends. Supported on power driven sprockets S in a position to apply compression to the belts 42 and 43 in their downward travel are the articulated chains 52 and 53 which have pivotally mounted thereon, at spaced longitudinal points, a series of platform chain links with resilient pads 52a and 53a respectively. As is clear from FIG. 4, these chains are adjusted so as to apply pressure on the porous endless bands 42 and 43 from opposite sides to hold them in sealing relationship and to apply the required driving force to the belts 42 and 43 so that they will travel linearly at the same speeds.

Each of the powder feed pipes, such as, for example, the pipe 27, see FIG. 5, is provided with an adjustable gate at the lower end thereof, by means of which the depth of the layer of powder P being supplied onto the related belt, that is the belt 43 in this case, can be adjusted. As illustrated in this case, the gate 30 is vertically adjustable with respect to the plane of the belt 43 at this point by means of a threaded stem 32 coacting with an abutment 34 on the pipe 27. The threaded stem 32 is provided with a pair of locknuts to hold the gate 30 in adjusted position. Each of these feed pipes is provided with such an adjustable gate so that the layer of powder P applied thereto would be of the required depth, so that when two such layers come together, as shown in FIG. 4, the powder will be compressed around the end of each rod R projecting thereinto. The suction box, that is the box 37 in the case of FIG. 5, is provided with perforations so as to cause the layer of powder to adhere to the belt 43 in this case until the rectangular enclosure is formed by the coincidence of the two belts.

Supported below the idler rollers 48 and 50 is a collector hopper 54, which serves to collect the unused powder, which is released by the belts 42 and 43 at their point of separation at the idler rollers 48 and 50. The vacuum line 22 is connected to this hopper so as to recover any of the released powder which is suspended in the air. The hopper is provided with a downwardly extending channel, which is connected to a conveyor, such as a screw conveyor 56 supported therebelow, see FIG. 1, which conveyor discharges into a vertical conveyor 58 of suitable form so as to return the main body of the powder back to the supply hopper 18 for reuse.

In order to conduct the hanger rods R through the process they are delivered by any suitable form of feeder 52 onto a chain conveyor A, so as to travel first in a horizontal plane, see FIG. 1, over the heaters 74. At these heaters the rods are brought to a temperature such as required for the particular coating powder used, so as to fuse particles of that powder onto the rod and cause them initially to adhere thereto over the areas to be coated.

Turnng to FIG. 6 it will be seen that the chain conveyor A is, in fact, a pair of chains arranged to support the rods R in a horizontal position at a pair of longitudinally spaced points therealong. The chains A pass around idler sprockets 65 so as to change their direction of travel vertically. At the sprockets 65 they are met by a central chain C, which engages the rods R from the top so that these rods are clamped between the pair of chains A and the single central chain C. The relationship of these chains is like their relationship illustrated in FIG. 6. Thus, the heated rods are held on the chains A and carried around by the chains A and C until they are brought into a position so that the ends of the rods can be caught between the endless belt pairs represented at one end by the pair 42–43. The rods now travel in a vertical direction with their ends immersed in the powder P in the rectangular enclosure formed at each end by the belts so that the powder is compressed around the ends of the rods. As explained above, since the rods are heated the adjacent powder is softened and adheres to the ends of the rod. During the downward travel of the rods so immersed in the powder the chain assemblies A and C travel in the same vertical plane as the two belt assemblies. The chains A pass around the sprockets 70 and return back to the rod feeder 62. At this point the chain C meets up with the chains B of which there are a pair, which coact with the chain C, so as to carry the rods with their coated ends vertically through the heating devices 72, where the attached partially fused powder is further heated, so as to coalesce and form a more or less continuous coating on the ends of the rods.

The showing in FIG. 6 will illustrate the simple relationship by means of which the rods are transferred from one set of chains to the other. As will be seen in FIG. 6, the chain C clamps the rods R between the pair of chains A, which are driven by the sprockets 70 mounted on the shaft 66. The pair of chains B move into operation and coaction with the chain C by passing around the sprockets 64 and 68, also mounted on the shaft 66. Thus, at the shaft 66 the chain A is diverted and returned to the feeding station while the chain C continues on through the heaters 72. At the shaft 66 the pair of chains B come into play to carry the rods R onwardly from that point.

Thus, the rods are carried through the heaters 72 and then over through the cooling section CS where the chains carry the coated rods vertically in opposite directions through a series of passes until they are sufficiently cooled. At the sprockets 166 the chain C separates from the path of the chains B and moves upwardly back to the sprocket station 65. On the other hand the chains B carry the rods R to the delivery station DS. All of the chains are driven by the main motor M by a belt or chain connection from it to the sprockets which carry the chains. At the delivery station the chains B return back to the sprockets assembled on the shaft 66 to repeat their travel through the coalescing heater and cooling stations.

It is desirable to mount the heaters 72 on the frame 73 supported by the hinge pins 75 so that the motor 76 raises the heaters whenever the machine is stopped to prevent burning of the coated rod ends.

From the above description it will be seen that a continuous reliable process is provided by means of which large numbers of elongated members can be coated over desired areas, as, for example, their ends, by causing them to travel in a predetermined path. In this path the rods are first heated to the necessary temperature, then immersed and compressed in a body of the powder to form the coating after which they pass to a second heating operation to fuse the coating particles into a substantially continuous coating after which they are cooled and discharged.

It will be apparent to those skilled in the art that many changes in the details of construction of the apparatus and the process may be effected without departing from the basically novel subject matter of this invention. By way of example, it is apparent that the temperatures required during the operation will be variable, depending upon the nature of the coating materials used. Furthermore, it is apparent that no heating at all may be necessary in cases where an adhesive is applied to the areas to be coated, which adhesive might even have a solvent action on the powder to cause a coalescing of the coating.

It is preferred, therefore, that the scope of this invention be determined by the appended claims rather than by the limitations of the embodiment selected for illustrative purposes.

What is claimed is:

1. A method of applying a powder to form a coating around the end of a discontinuous member, such as a file folder hanger rod, comprising the steps of advancing said member end along a given path, conditioning said member end to cause the coating powder to adhere thereto when brought into contact therewith, compressing said powder around said member end while said end and said powder in compression around said member end advance along said path to adhere particles of said powder to said member end and fusing said pwoder to said member end.

2. The method of claim 1 wherein the conditioning step comprises heating said member end to a temperature sufficient to cause adherence of said powder to the member end upon contact therewith.

3. The method of claim 1, wherein the compressing step comprises the steps of continuously feeding the coating powder into a travelling powder chamber, moving said member end into and along with said chamber, and pressing said powder in said chamber against said member end while moving therewith.

4. A machine for coating with powder a succession of ends of elongated discontinuous members, such as file folder hanger rods, comprising means for advancing such ends along a given path, means mounted on said path for movably compressing a partially enclosed mass of coating powder around each successive end of said advancing members as said member ends are advanced along said path under compression by said powder, and means operatively associated with the aforesaid means for causing particles of said powder to adhere to the surfaces and edges of said member ends when so compressed around said ends.

5. In the apparatus of claim 4 wherein said means for causing the powder to adhere on said member ends comprises means for fusing said powder into a coating around said member ends.

6. In the apparatus of claim 4 further comprising means mounted on said path for heating said member ends as such ends are advanced along said path prior to contacting said ends with said powder.

7. The machine as claimed in claim 4, wherein said means for compressing the moving mass of coating powder around the member ends comprises a partially enclosed movable powder chamber, means for inserting the member ends into said chamber and for moving said ends with said chamber while inserted therein, means for pressing the powder in the chamber against said ends, and means for feeding powder to said chamber to replenish that which is removed from said chamber by said member ends.

8. The machine as claimed in claim 7 wherein said movable powder chamber comprises a pair of movable belts having raised compressible edges and means for facing said belts against each other with the raised compressible edges in closed contact with each other to form a chamber defined by the inner surfaces of the belts and their contacting edges.

9. The machine as claimed in claim 8 wherein said means for pressing the powder against said ends comprises means contacting the outer surfaces of said belts for pressing said belts toward each other.

10. The machine as claimed in claim 8 wherein said belts are porous and further comprising suction means mounted adjacent the outer surfaces of said belts for holding the powder on the belts as they are faced against each other by said facing means.

References Cited

UNITED STATES PATENTS

| | | | |
|---|---|---|---|
| 2,341,732 | 2/1944 | Marvin | 117—22X |
| 2,760,229 | 8/1956 | Cheney et al. | 117—21X |
| 2,789,926 | 4/1957 | Finholt et al. | 117—21X |
| 3,019,126 | 1/1962 | Bartholomew | 117—21X |
| 3,032,816 | 5/1962 | Zimmerli | 117—18X |
| 3,108,022 | 10/1963 | Church | 117—21X |
| 3,197,324 | 7/1965 | Brooks | 117—21X |
| 2,995,482 | 8/1961 | Boyce et al. | 117—21X |
| 3,310,431 | 3/1967 | Loose | 117—21X |

WILLIAM D. MARTIN, Primary Examiner

F. J. CABIC, Assistant Examiner

U.S. Cl. X.R.

117—25, 43, 128.4; 118—423